US012308575B2

(12) United States Patent
Yamanashi et al.

(10) Patent No.: US 12,308,575 B2
(45) Date of Patent: May 20, 2025

(54) SHIELD CONNECTOR INCLUDING INCLINED LOCKING SURFACE LOCKING HOLDER TO SHELL

(71) Applicant: Yazaki Corporation, Tokyo (JP)

(72) Inventors: Daisuke Yamanashi, Shizuoka (JP); Takashi Sone, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 374 days.

(21) Appl. No.: 17/960,785

(22) Filed: Oct. 5, 2022

(65) Prior Publication Data

US 2023/0110487 A1 Apr. 13, 2023

(30) Foreign Application Priority Data

Oct. 11, 2021 (JP) ................................ 2021-166564

(51) Int. Cl.

| | |
|---|---|
| ***H01R 13/648*** | (2006.01) |
| ***H01R 13/422*** | (2006.01) |
| ***H01R 13/506*** | (2006.01) |
| ***H01R 13/52*** | (2006.01) |
| ***H01R 103/00*** | (2006.01) |

(52) U.S. Cl.

CPC ......... *H01R 13/648* (2013.01); *H01R 13/422* (2013.01); *H01R 13/506* (2013.01); *H01R 13/5205* (2013.01); *H01R 13/5208* (2013.01); *H01R 2103/00* (2013.01)

(58) Field of Classification Search

None

See application file for complete search history.

(56) References Cited

U.S. PATENT DOCUMENTS

| | | | | |
|---|---|---|---|---|
| 2002/0048994 A1* | 4/2002 | Oota ........................ | H01R 9/24 439/98 |
| 2015/0144396 A1* | 5/2015 | Tanaka ................. | H02G 15/007 174/668 |
| 2021/0066849 A1 | 3/2021 | Takagi et al. | |
| 2022/0037830 A1* | 2/2022 | Aoshima ............ | H01R 13/4223 |
| 2024/0275105 A1* | 8/2024 | Higuchi ............. | H01R 13/5825 |

FOREIGN PATENT DOCUMENTS

JP 2021-39889 A 3/2021

* cited by examiner

*Primary Examiner* — Oscar C Jimenez

(74) *Attorney, Agent, or Firm* — KENEALY VAIDYA LLP

(57) ABSTRACT

A shield connector includes: a housing that holds a terminal; a seal member; a holder coupled to the housing along an axial direction of the housing to support the seal member; and a shell, in which the shell has a protruding portion protruding inward from an inner wall surface of the shell, the holder has an engagement piece extending along the axial direction, and is locked by the shell by engaging the engagement piece with the protruding portion, the protruding portion has a locking surface that locks the engagement piece, and the locking surface is a surface facing an insertion direction in which the holder is inserted into the shell, and is an inclined surface toward the insertion direction as the locking surface extends toward a tip of the protruding portion in a protruding direction.

3 Claims, 11 Drawing Sheets

SHIELD CONNECTOR INCLUDING INCLINED LOCKING SURFACE LOCKING HOLDER TO SHELL

CROSS-REFERENCE TO RELATED APPLICATION(S)

The present application claims priority to and incorporates by reference the entire contents of Japanese Patent Application No. 2021-166564 filed in Japan on Oct. 11, 2021.

BACKGROUND OF THE INVENTION

1. Field of the Invention

The present invention relates to a shield connector.

2. Description of the Related Art

Conventionally, there is a shield connector. Japanese Patent Application No. 2021-39889 discloses a connector including a housing, a rear holder which is held by the housing, and a rubber stopper which is sandwiched between the housing and the rear holder.

When a housing and a holder are accommodated in a shielding shell, a structure for locking the housing or the holder is provided. For example, the shell is provided with a protruding portion for locking the holder. When the holder is locked by the shell, it is desirable to be able to prevent the holder from coming off from the shell.

SUMMARY OF THE INVENTION

An object of the present invention is to provide a shield connector capable of preventing a holder from coming off from a shell.

In order to achieve the above mentioned object, a shield connector according to one aspect of the present invention includes a cylindrical housing that accommodates a terminal and holds the terminal; an annular seal member that seals between an outer peripheral surface of an electric wire connected to the terminal and an inner wall surface of the housing; a holder coupled to the housing along an axial direction of the housing to support the seal member; and a conductive shell into which the housing and the holder coupled to each other are inserted along the axial direction, wherein the shell has a protruding portion protruding inward from an inner wall surface of the shell, the holder has an engagement piece extending along the axial direction, and is locked by the shell by engaging the engagement piece with the protruding portion, the protruding portion has a locking surface that locks the engagement piece, and the locking surface is a surface facing an insertion direction in which the holder is inserted into the shell, and is an inclined surface toward the insertion direction as the locking surface extends toward a tip of the protruding portion in a protruding direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A shield connector according to embodiments of the present invention will be described in detail below with reference to the drawings. Note that the present invention is not limited by the embodiments. Further, the components in the following embodiments include those which can be easily assumed by those skilled in the art or those which are substantially the same.

EMBODIMENT

Figure 1:
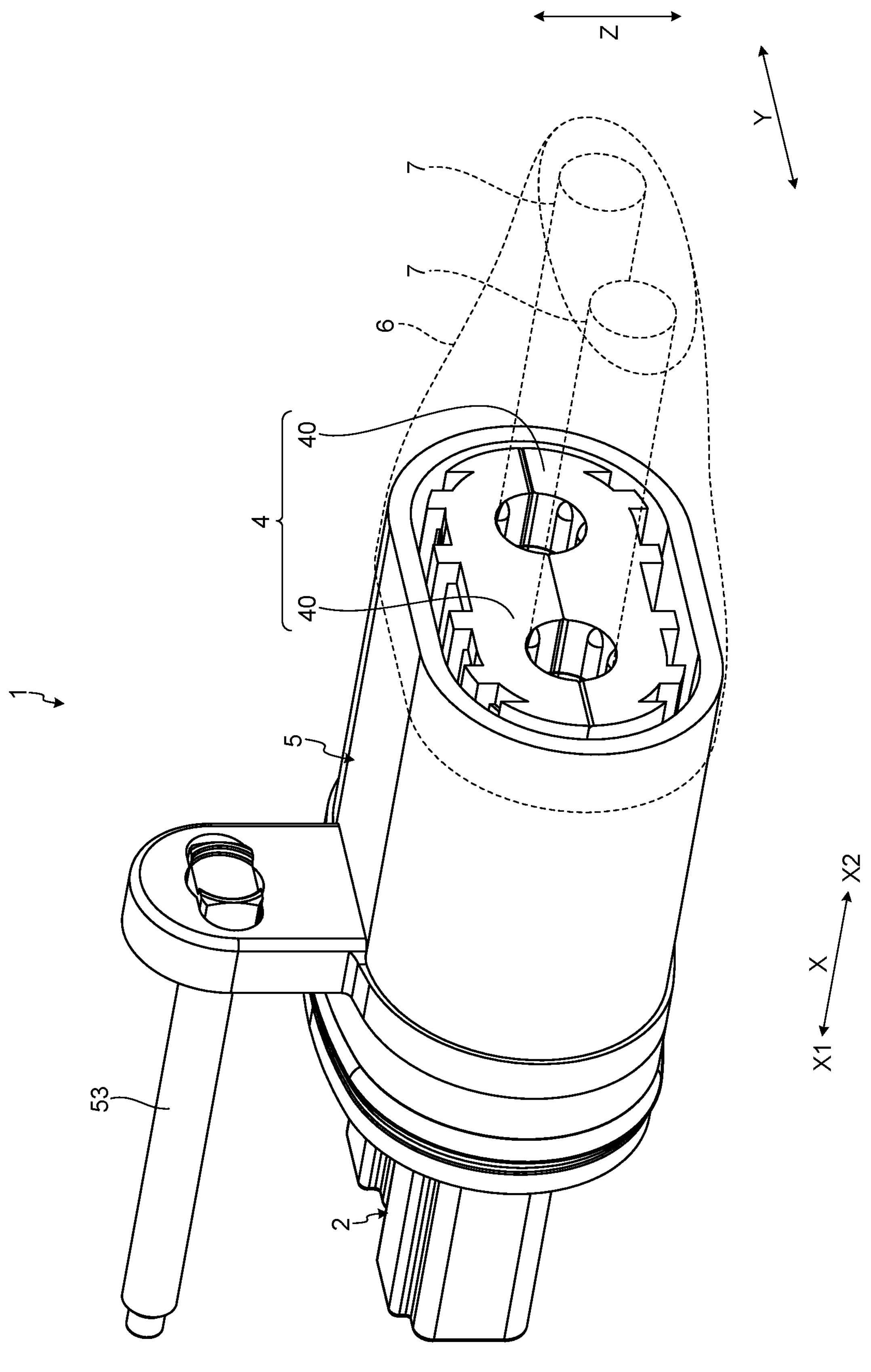
FIG. 1 is a perspective view of a shield connector according to an embodiment.
Figure 2:
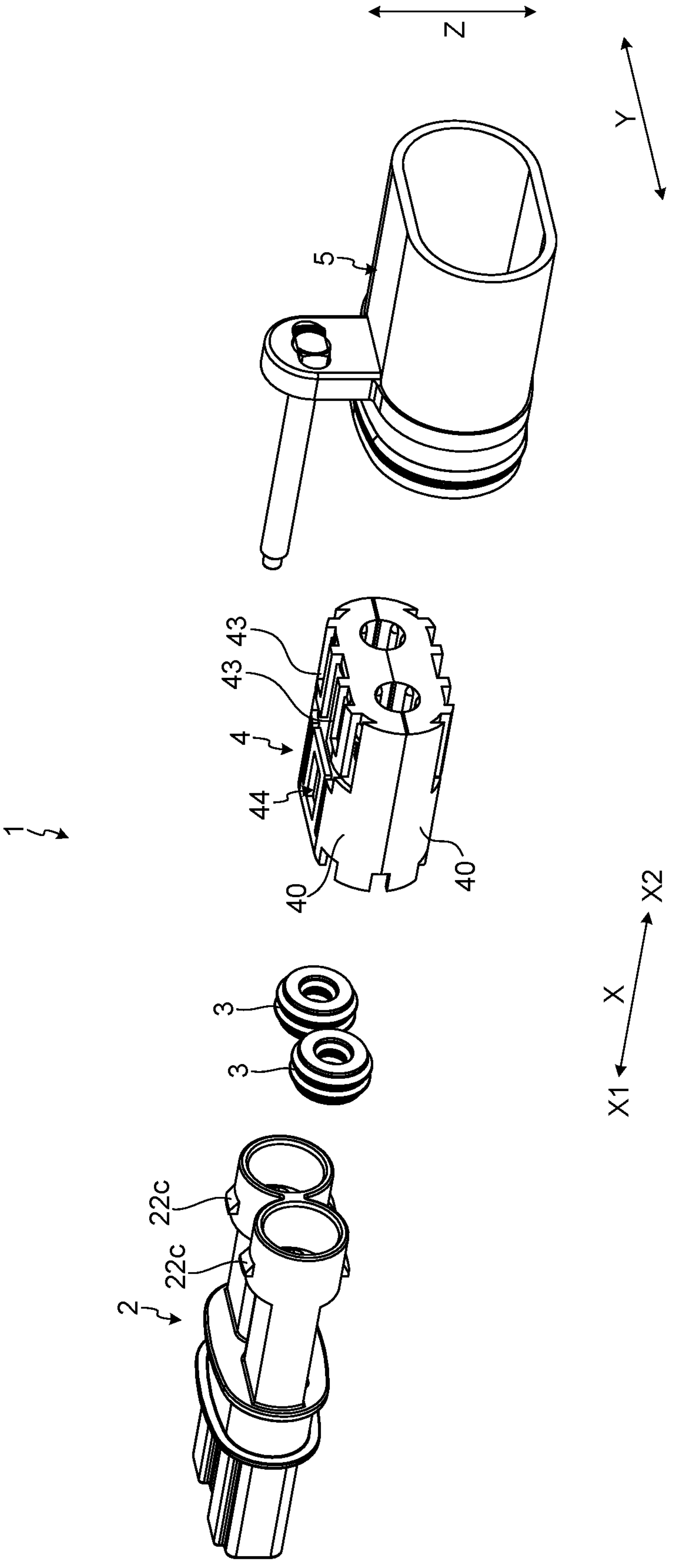
FIG. 2 is an exploded perspective view of the shield connector according to the embodiment.
Figure 3:
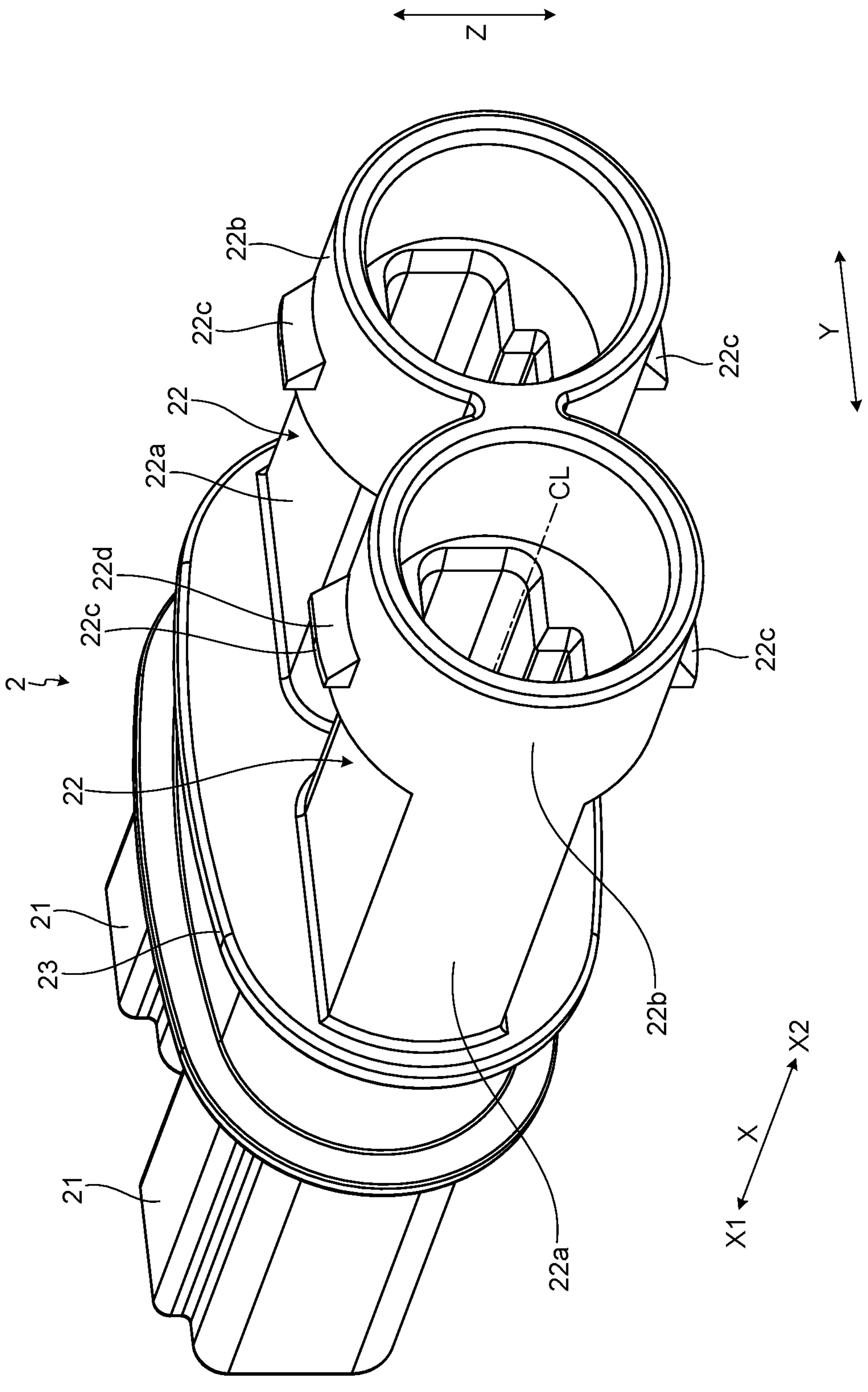
FIG. 3 is a perspective view of a housing according to the embodiment.
Figure 4:
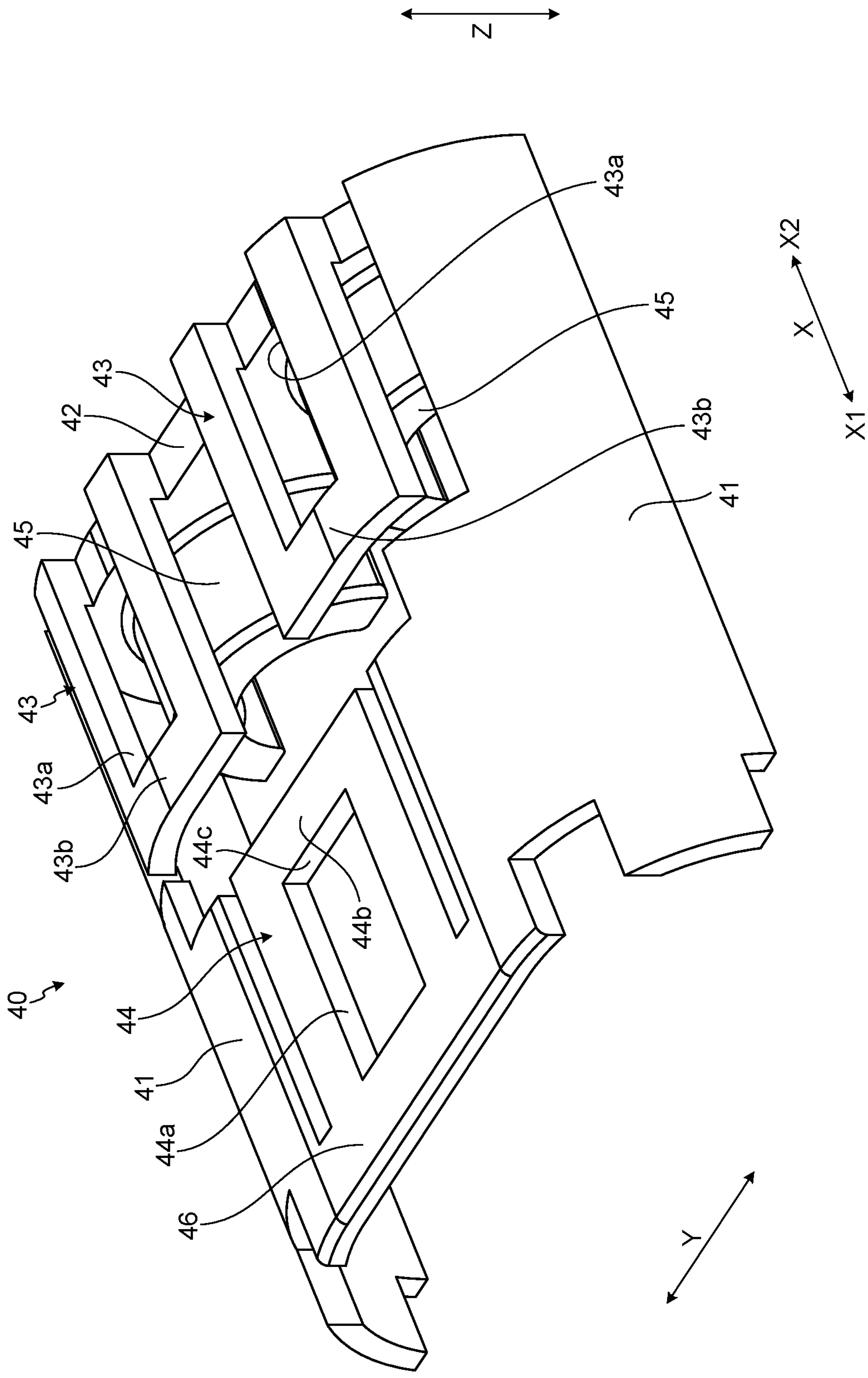
FIG. 4 is a perspective view of a support according to the embodiment.
Figure 5:
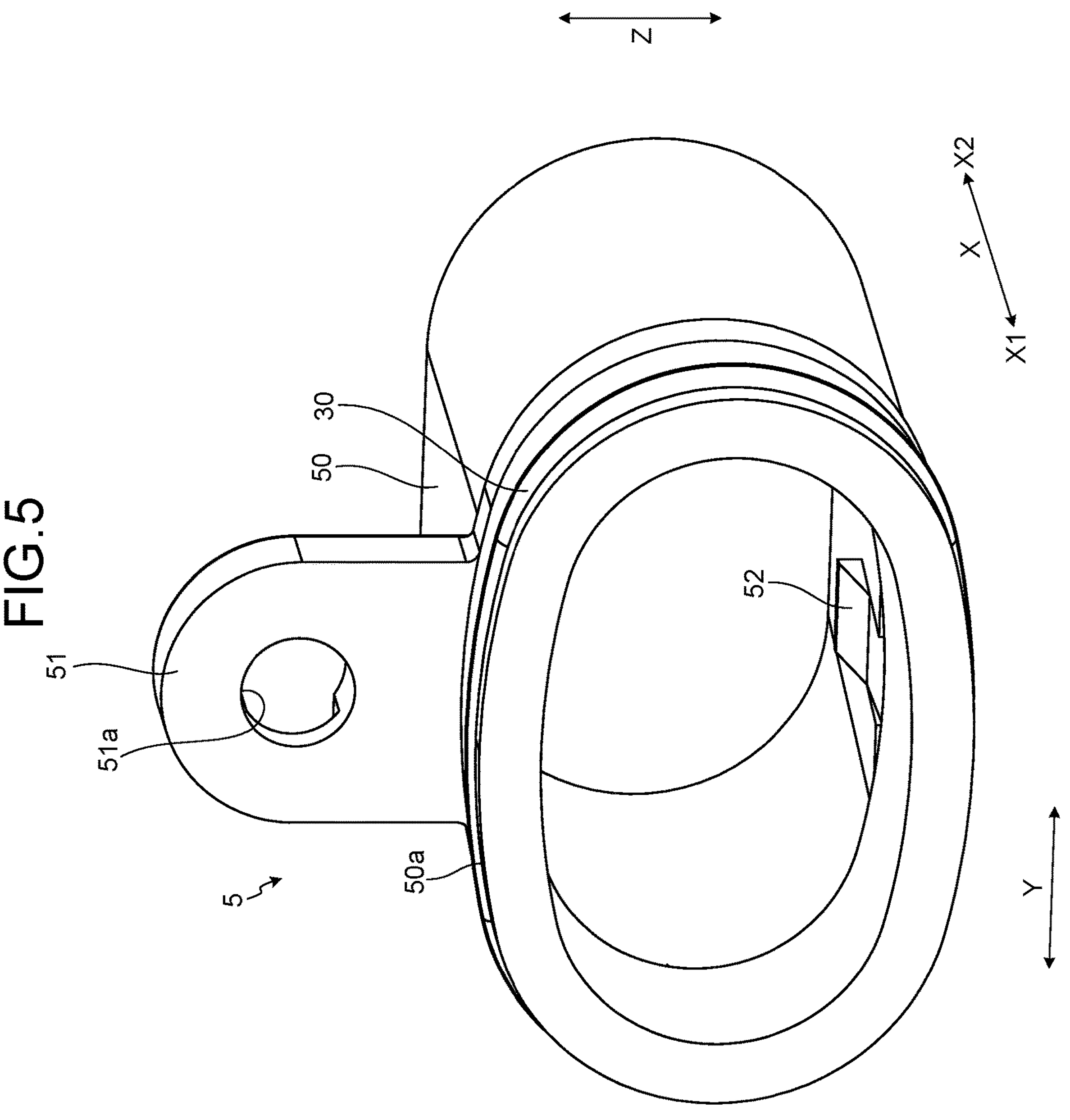
FIG. 5 is a perspective view of a shell according to the embodiment.
Figure 6:
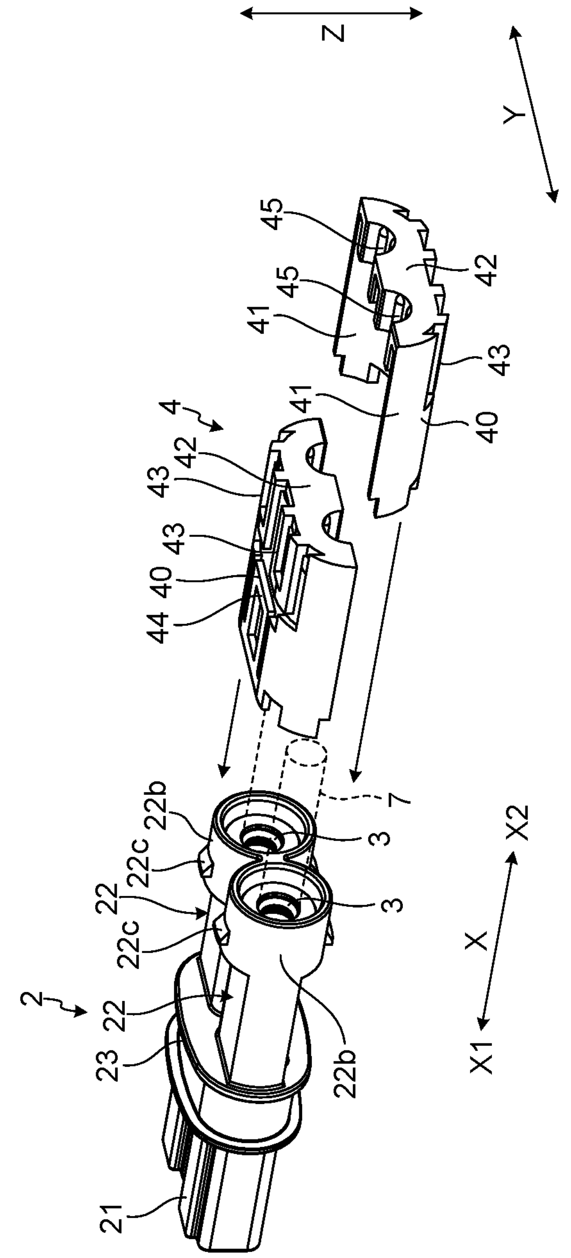
FIG. 6 is a perspective view of the housing and a holder according to the embodiment.
Figure 7:
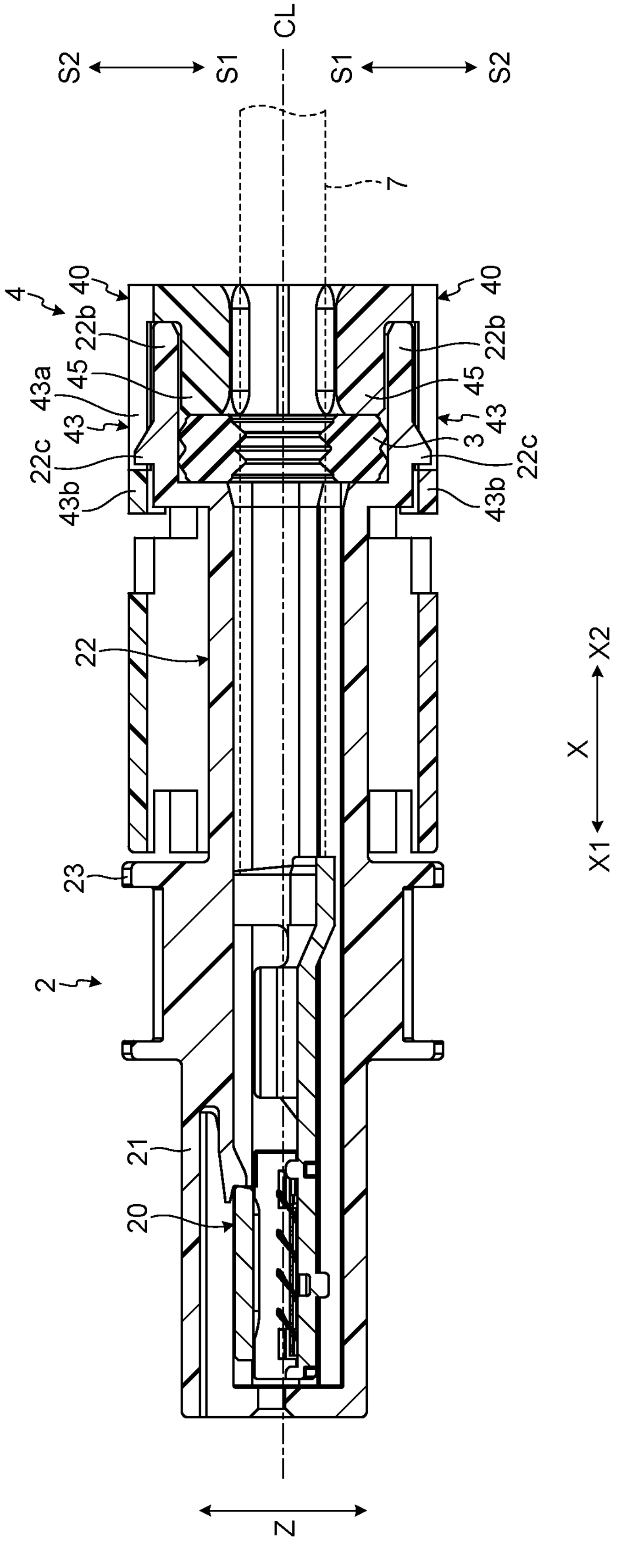
FIG. 7 is a cross-sectional view of a coupling body according to the embodiment.
Figure 8:
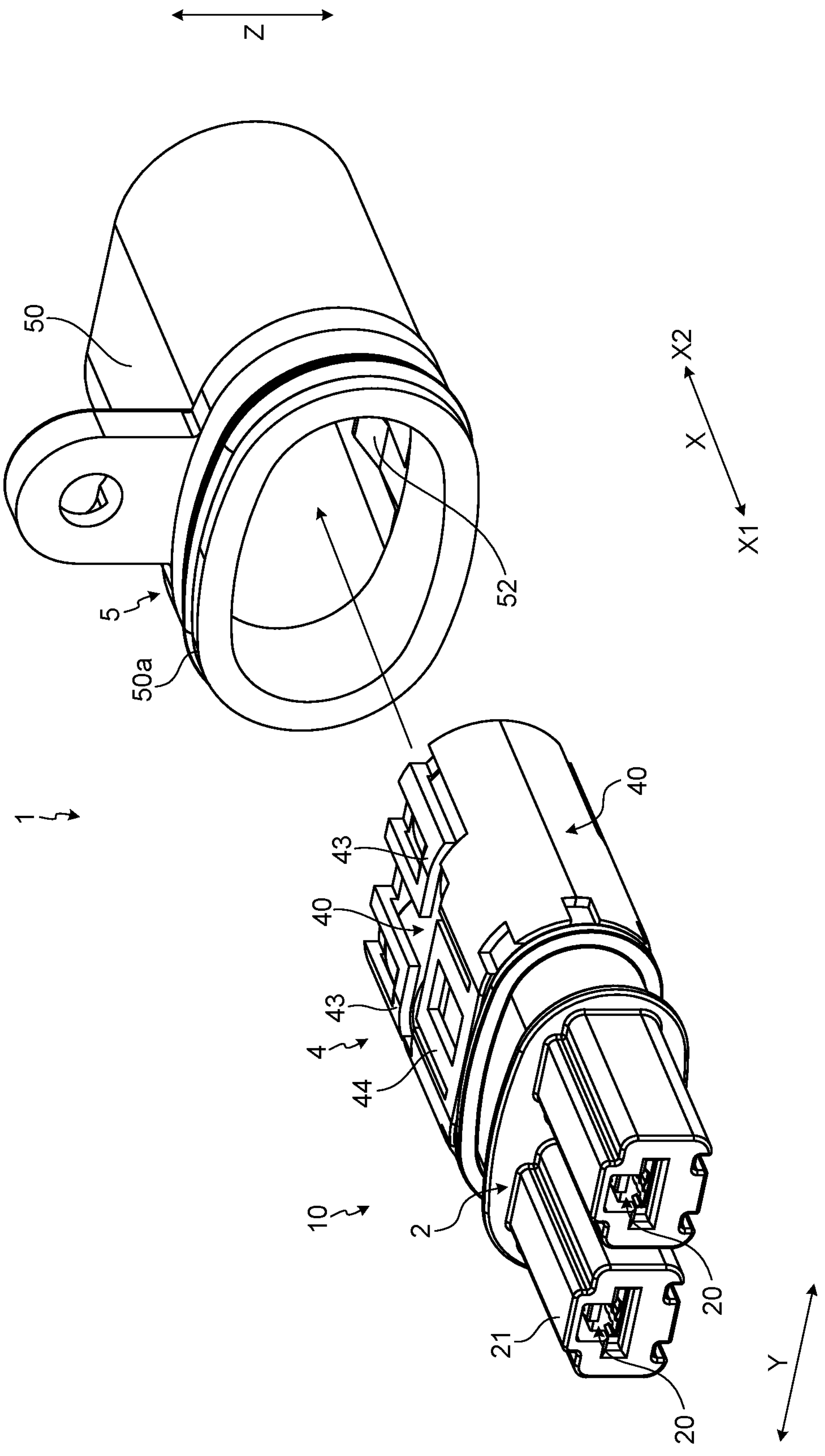
FIG. 8 is a perspective view of the coupling body and the shell according to the embodiment.
Figure 9:
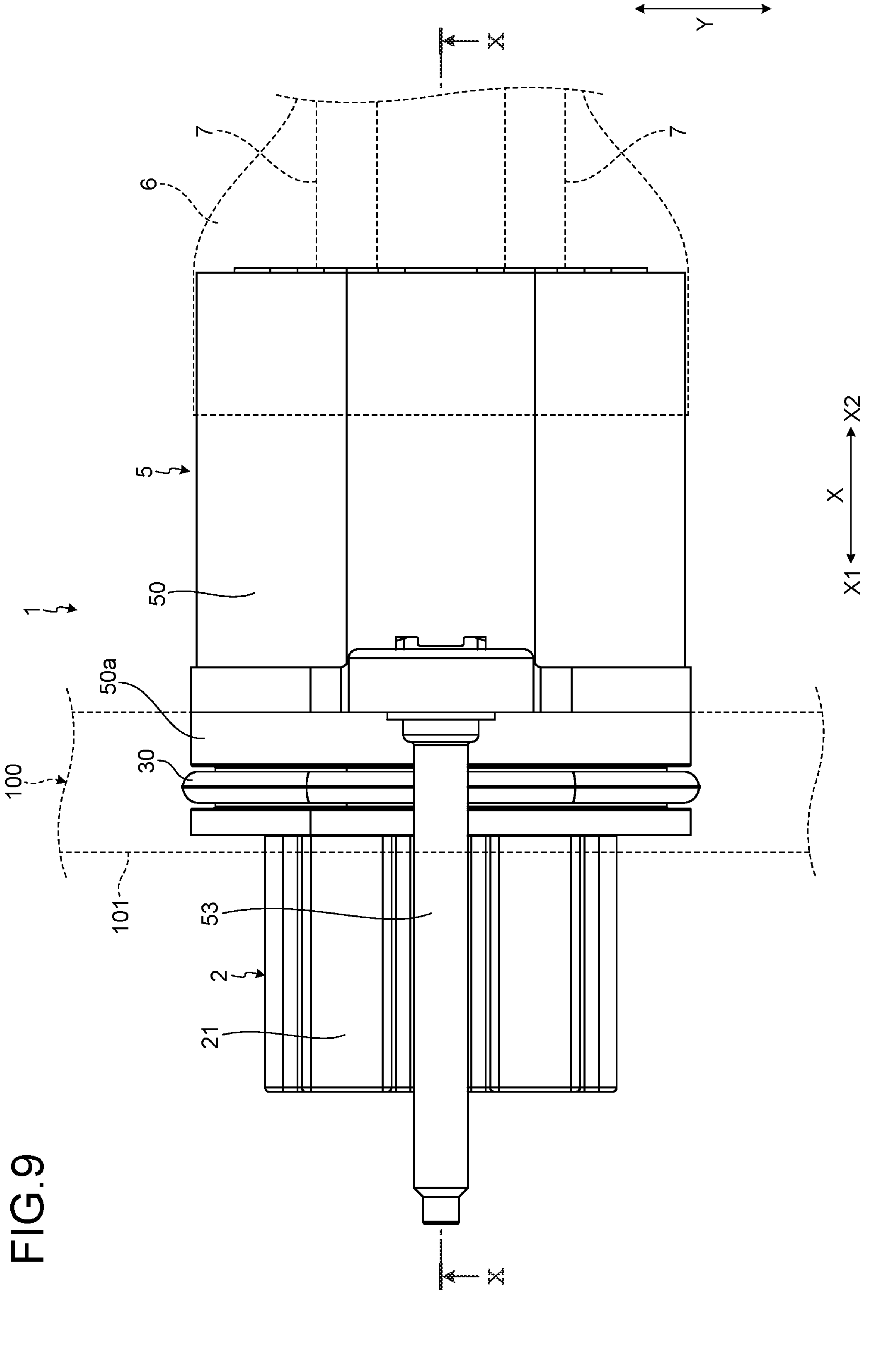
FIG. 9 is a plan view of the shield connector according to the embodiment.
Figure 10:
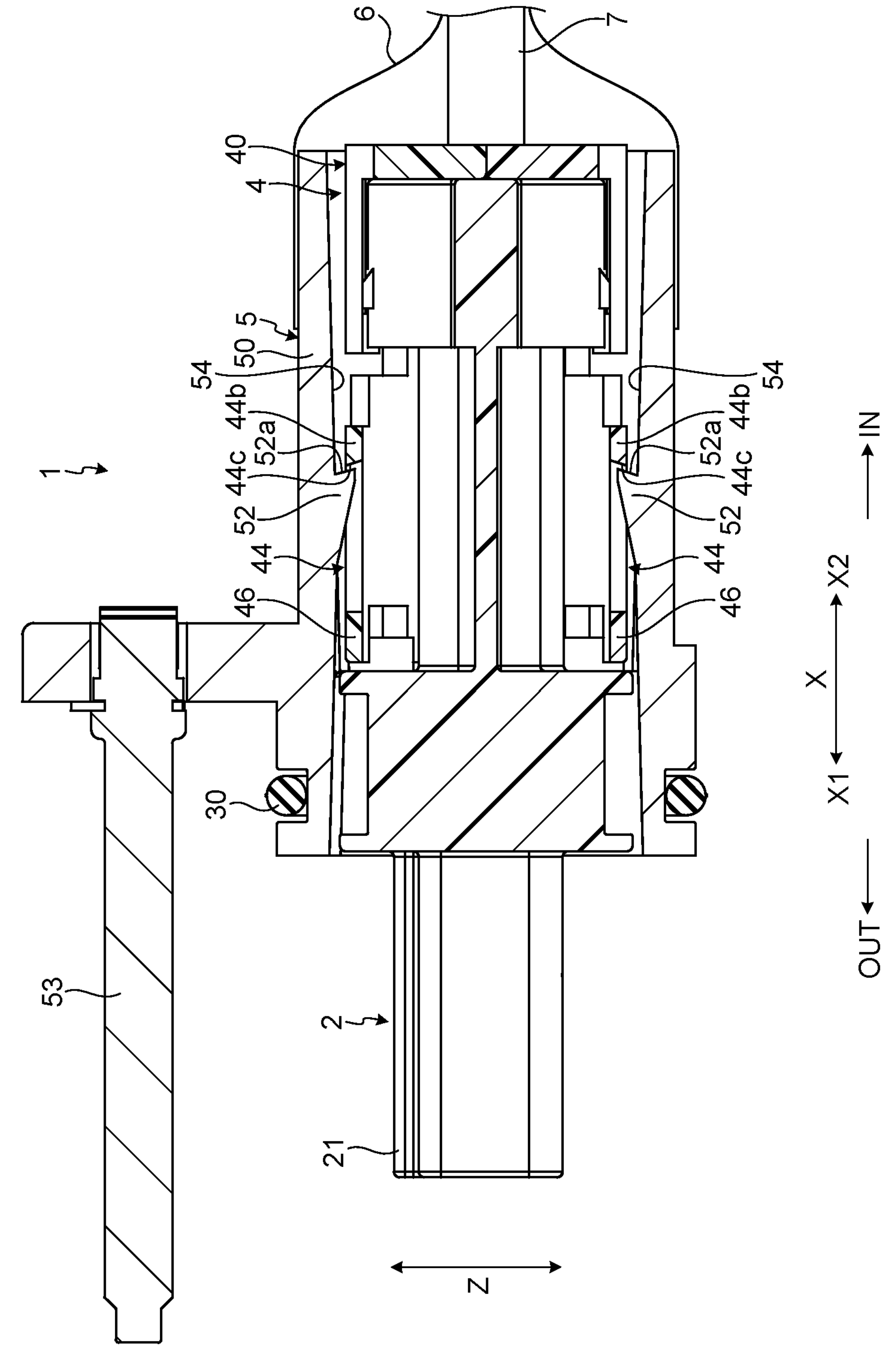
FIG. 10 is a cross-sectional view of the shield connector according to the embodiment.
Figure 11:
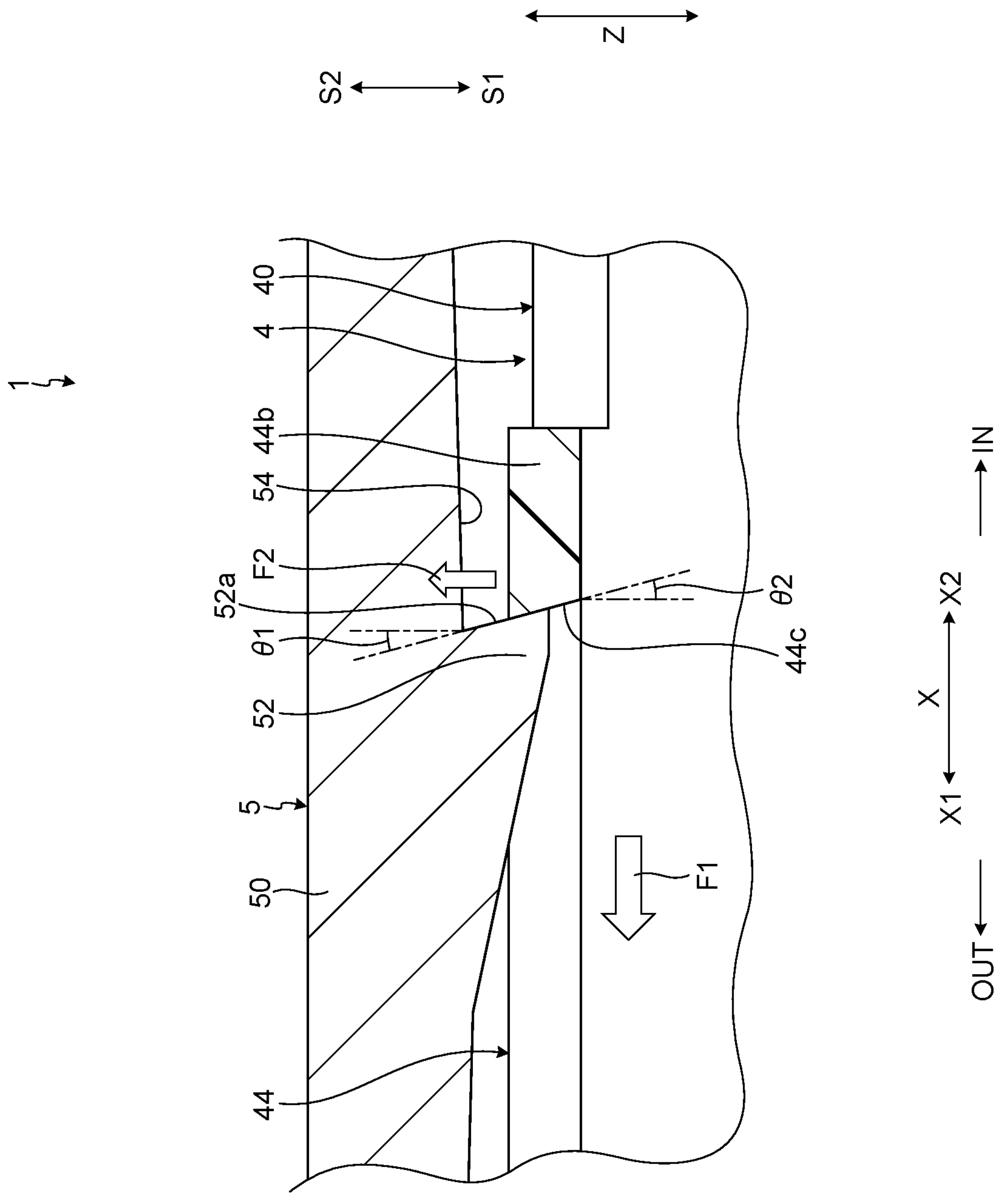
FIG. 11 is a cross-sectional view of a locking structure according to the embodiment.

An embodiment will be described with reference to FIGS. 1 to 11. The present embodiment relates to a shield connector. FIG. 1 is a perspective view of a shield connector according to the embodiment, FIG. 2 is an exploded perspective view of the shield connector according to the embodiment, FIG. 3 is a perspective view of a housing according to the embodiment, FIG. 4 is a perspective view of a support according to the embodiment, FIG. 5 is a perspective view of a shell according to the embodiment, FIG. 6 is a perspective view of the housing and a holder according to the embodiment, FIG. 7 is a cross-sectional view of a coupling body according to the embodiment, FIG. 8 is a perspective view of the coupling body and the shell according to the embodiment, FIG. 9 is a plan view of the shield connector according to the embodiment, FIG. 10 is a cross-sectional view of the shield connector according to the embodiment, and FIG. 11 is a cross-sectional view of a locking structure according to the embodiment. FIG. 10 illustrates a cross section taken along line X-X of FIG. 9.

A shield connector 1 of the present embodiment is connected to, for example, a device mounted on a vehicle such as an automobile. As illustrated in FIGS. 1 and 2, the shield connector 1 includes a housing 2, a seal member 3, a holder 4, and a shell 5. The shield connector 1 is connected with an electric wire 7 covered with a braid 6. The shell 5 is a cylindrical member formed of a metal having conductivity, and is referred to as a shield shell. An end portion of the braid 6 is fixed to the outer peripheral surface of the shell 5. The shell 5 is fixed to a casing of a device which is a connection destination, and is electrically connected to the casing. In other words, the braid 6 is grounded to the casing of the device via the shell 5.

The housing 2 is a cylindrical member that accommodates and holds a terminal connected to an end portion of the electric wire 7. The housing 2 is formed of, for example, an insulating synthetic resin. The electric wire 7 is drawn outward from an end portion of the housing 2. The seal member 3 is a member that seals between the outer peripheral surface of the electric wire 7 and the inner wall surface of the housing 2. The seal member 3 is formed of, for example, a resin having elasticity. The holder 4 is a member that is coupled to the housing 2 to support the seal member 3. The holder 4 is formed of, for example, an insulating synthetic resin. The illustrated holder 4 is formed by combining two supports 40.

The housing 2 and the holder 4 are inserted into the shell 5 in a state of being coupled to each other and are engaged with the shell 5. The shield connector 1 of the present embodiment locks an engagement piece 44 of the holder 4 by the shell 5 as described below. The locking surface of the shell 5 is an inclined surface that locks the engagement piece 44 more deeply when a force in the removal direction acts on the holder 4. Therefore, the shield connector 1 of the present embodiment can prevent the holder 4 from coming off.

As illustrated in FIG. 3, the housing 2 has a flat cylindrical shape extending linearly. In the following description, the axial direction of the housing 2 is referred to as an "axial direction X", and the width direction of the housing 2 is referred to as a "width direction Y". The electric wire 7 is drawn out from the housing 2 along the axial direction X. The housing 2 holds a plurality of electric wires 7 arranged in the width direction Y. A direction orthogonal to both of the axial direction X and the width direction Y is referred to as a "height direction Z".

The housing 2 has two holding portions 21 and two cylindrical portions 22. The holding portion 21 and the cylindrical portion 22 each extend in the axial direction X. The two holding portions 21 and the two cylindrical portions 22 are each arranged in the width direction Y. One holding portion 21 communicates with one cylindrical portion 22, and the other holding portion 21 communicates with the other cylindrical portion 22. The holding portion 21 is a portion that holds a terminal 20. The illustrated holding portion 21 has a rectangular cylindrical shape.

The cylindrical portion 22 is a portion through which the electric wire 7 is inserted. The cylindrical portion 22 has a base portion 22*a* and a tip portion 22*b*. The base portion 22*a* is a portion on the base end side of the cylindrical portion 22 and is connected to the holding portion 21. The base portion 22*a* has a rectangular cylindrical shape. The tip portion 22*b* is a portion on the tip side of the cylindrical portion 22, and is located on the side opposite to the side of the holding portion 21. The tip portion 22*b* has a cylindrical shape. The seal member 3 is inserted into the tip portion 22*b*. The seal member 3 seals between the outer peripheral surface of the electric wire 7 and the inner wall surface of the tip portion 22*b*.

The outer wall portion of the tip portion 22*b* has a protruding portion 22*c*. The protruding portion 22*c* protrudes from the outer peripheral surface of the tip portion 22*b* in a radial direction orthogonal to the axial direction X. One tip portion 22*b* has two protruding portions 22*c* protruding toward mutually opposite directions. The two protruding portions 22*c* each protrude along the height direction Z. The two protruding portions 22*c* are disposed symmetrically with respect to a central axis CL of the cylindrical portion 22. In other words, the two protruding portions 22*c* are 180° out of phase with each other. The shape of the protruding portion 22*c* when viewed from the axial direction X is substantially rectangular. A surface 22*d* on the tip side in the axial direction X of the protruding portion 22*c* is an inclined surface inclined with respect to the height direction Z.

A flange portion 23 is provided at a connecting portion between the holding portion 21 and the cylindrical portion 22. The flange portion 23 is locked by the inner wall portion of the shell 5, thereby positioning the housing 2 in the axial direction X.

As illustrated in FIG. 4, the support 40 has a flat half-cylinder shape. The two supports 40 of the holder 4 have the same shape. The two supports 40 are combined to form a cylindrical body having an oval cross-sectional shape. One support 40 has a pair of side wall portions 41 and 41, a rear wall portion 42, a pair of engagement pieces 43 and 43, an engagement piece 44, and a pair of support walls 45 and 45. The rear wall portion 42 is located on a rear side X2 of the support 40 in the axial direction X. A front side X1 in the axial direction X indicates a front side in the engagement direction when the holder 4 is engaged with the housing 2. The rear side X2 indicates a side opposite to the front side X1 in the axial direction X.

The rear wall portion 42 is a flat plate-shaped wall portion orthogonal to the axial direction X. The pair of support walls 45 and 45 protrudes toward the front side X1 in the axial direction X from the rear wall portion 42. The support wall 45 has a half-cylinder shape and supports the seal member 3. The pair of support walls 45 and 45 is arranged in the width direction Y.

The side wall portion 41 is erected from an edge portion of the rear wall portion 42 toward the front side X1 in the axial direction X. One side wall portion 41 is connected to one end of the rear wall portion 42 in the width direction Y, and the other side wall portion 41 is connected to the other end of the rear wall portion 42 in the width direction Y. The cross-sectional shape of the side wall portion 41 is an arc shape.

The engagement piece 43 is a portion that is engaged with the housing 2 and couples the support 40 to the housing 2. The pair of engagement pieces 43 and 43 is erected from an edge portion of the rear wall portion 42 toward the front side X1 in the axial direction X. The engagement piece 43 is disposed between the pair of side wall portions 41 and 41. The pair of engagement pieces 43 and 43 is arranged in the width direction Y. One engagement piece 43 faces one support wall 45 in the height direction Z. The other engagement piece 43 faces the other support wall 45 in the height direction Z.

The base end of the engagement piece 43 is supported by the rear wall portion 42, and the tip of the engagement piece 43 is a free end. The engagement piece 43 has elasticity so as to be able to bend in the height direction Z. The shape of the engagement piece 43 when viewed from the height direction Z is substantially rectangular. The engagement piece 43 has a through-hole 43*a*. The through-hole 43*a* penetrates the engagement piece 43 along the height direction Z. The shape of the through-hole 43*a* when viewed from the height direction Z is substantially rectangular. The engagement piece 43 has a locked portion 43*b*. The locked portion 43*b* is a tip portion of the engagement piece 43 and is locked by the protruding portion 22*c* of the housing 2. The locked portion 43*b* is plate-shaped and extends along the width direction Y.

The tips of the pair of side wall portions 41 are connected to each other by a connecting wall 46 extending along the width direction Y. The engagement piece 44 is a portion that is engaged with the shell 5 and is locked by the shell 5. The engagement piece 44 protrudes toward the rear side X2 in the axial direction X from the connecting wall 46. The tip of the engagement piece 44 faces the tips of the pair of engagement pieces 43 and 43 in the axial direction X. The shape of the engagement piece 44 when viewed from the height direction Z is substantially rectangular. The engagement piece 44 has a through-hole 44*a*. The through-hole 44*a* penetrates the engagement piece 44 along the height direction Z. The shape of the through-hole 44*a* when viewed from the height direction Z is substantially rectangular.

The engagement piece 44 has a locked portion 44*b*. The locked portion 44*b* is a tip portion of the engagement piece 44 and is locked by a protruding portion 52 of the shell 5. The locked portion 44*b* is plate-shaped and extends along the width direction Y. The locked portion 44*b* has a locked surface 44*c*. The locked surface 44*c* is a surface facing the front side X1 in the axial direction X, and is locked by the protruding portion 52 of the shell 5.

As illustrated in FIG. 5, the shell 5 includes a cylindrical main body 50, a fixing portion 51, and a protruding portion 52. The shape of the main body 50 in a cross section orthogonal to the axial direction X is an oval shape. The fixing portion 51 protrudes toward the height direction Z from the outer wall surface of the main body 50. The fixing portion 51 has a through-hole 51*a* through which a fastening member 53 can be inserted. The main body 50 has a fitting portion 50*a* that fits into an opening provided in the casing of the device. A seal member 30 is mounted on the outer wall surface of the fitting portion 50*a*. The seal member 30 seals between the fitting portion 50*a* and the opening of the casing.

The protruding portion 52 protrudes toward the height direction Z from the inner wall surface of the main body 50. The protruding portion 52 is engaged with the engagement piece 44 of the holder 4 to lock the holder 4. The shell 5 has two protruding portions 52 corresponding to the two supports 40.

As illustrated in FIG. 6, the two supports 40 are coupled to the housing 2 along the axial direction X. The two supports 40 are each attached to the housing 2 while sliding toward the front side X1 with respect to the housing 2. The engagement piece 43 of one of the supports 40 is engaged with the protruding portion 22*c* protruding toward one side in the height direction Z. The engagement piece 43 of the other of the supports 40 is engaged with the protruding portion 22*c* protruding toward the other side in the height direction Z.

As illustrated in FIG. 7, the engagement piece 43 of the support 40 is engaged with the protruding portion 22*c* of the housing 2 from an outer side S2. The outer side S2 is the side remote from the central axis CL of the cylindrical portion 22, and an inner side S1 is the side close to the central axis CL. When the engagement piece 43 is engaged with the protruding portion 22*c*, the locked portion 43*b* rides over the protruding portion 22*c*. At this point, the engagement piece 43 is bent and deformed toward the outer side S2. The protruding portion 22*c* enters the through-hole 43*a* of the engagement piece 43 and locks the locked portion 43*b*. The protruding portion 22*c* regulates the relative movement of the support 40 toward the rear side X2 with respect to the housing 2.

The support 40 holds the tip portion 22*b* of the housing 2 by sandwiching the tip portion 22*b* by the engagement piece 43 and the support wall 45. The tip surface of the support wall 45 abuts against the seal member 3 to support the seal member 3. As illustrated in FIG. 7, the holding portion 21 of the housing 2 holds the terminal 20. The electric wire 7 connected to the terminal 20 extends to an external space through an internal space of the cylindrical portion 22, the seal member 3 and the holder 4.

As illustrated in FIG. 8, the housing 2 and the holder 4 coupled to each other are inserted into the shell 5. A coupling body 10 in which the housing 2 and the holder 4 are coupled to each other is inserted into the shell 5 from the fitting portion 50*a* of the shell with the holder 4 as the first one to be inserted. The engagement piece 44 is engaged with the protruding portion 52 of the shell 5 and is locked by the protruding portion 52. The shell 5 accommodates and holds the coupling body 10 inside the shell 5.

As illustrated in FIG. 9, the shell 5 holding the coupling body 10 is attached to a wall portion 101 of a casing 100 of the device. The fitting portion 50*a* is inserted into an opening of the wall portion 101 and is fitted to the opening. The shell 5 is fixed to the wall portion 101 by the fastening member 53. The fastening member 53 is, for example, a bolt which is inserted into the through-hole 51*a* of the shell 5. In this case, a nut is screwed onto the fastening member 53 inserted into the wall portion 101. The holding portion 21 of the housing 2 is connected to, for example, a connector of a device. The terminal 20 is connected to a terminal of a mating connector.

As illustrated in FIG. 10, the two protruding portions 52 of the shell 5 each protrude from an inner wall surface 54 of the main body 50. The two protruding portions 52 face each other in the height direction Z. The engagement piece 44 of the holder 4 is locked by the protruding portion 52 of the shell 5. More specifically, the protruding portion 52 has a locking surface 52*a* that locks the engagement piece 44. The locking surface 52*a* is a surface facing the rear side X2 in the axial direction X. In other words, the locking surface 52*a* is a surface facing an insertion direction IN in which the holder 4 is inserted into the shell 5. The locking surface 52*a* faces the locked surface 44*c* of the engagement piece 44 in the axial direction X and locks the locked surface 44*c*. Of the two protruding portions 52 of the shell 5, one protruding portion 52 locks one support 40, and the other protruding portion 52 locks the other support 40.

As illustrated in FIG. 11, the locking surface 52*a* is an inclined surface inclined with respect to the height direction Z. The locking surface 52*a* is inclined toward the insertion direction IN as the locking surface extends toward the tip of the protruding portion 52 in the protruding direction. In other words, the locking surface 52*a* is inclined toward the rear side X2 as the locking surface extends toward the inner side S1. When the force F1 in a removal direction OUT acts on the holder 4, the locked surface 44*c* abuts against the locking surface 52*a*. At this point, the inclined locking surface 52*a* applies a force F2 toward the inner wall surface 54 to the locked portion 44*b*. The force F2 is a force in a direction to increase the overlapping height between the locking surface 52*a* and the locked surface 44*c*. In other words, the force F2 is a force in a direction of moving the locked portion 44*b* toward the outer side S2 so that the locked portion 44*b* is more deeply engaged with the protruding portion 52.

Therefore, the shield connector 1 of the present embodiment can prevent the holder 4 from coming off from the shell 5. Further, the shield connector 1 can improve the robustness of the locking portion between the protruding portion 52 and the engagement piece 44.

In the engagement piece 44 of the present embodiment, the locked surface 44*c* is an inclined surface inclined with respect to the height direction Z. The locked surface 44*c* is a surface facing the removal direction OUT, and is inclined toward the insertion direction IN as the locked surface extends further away from the inner wall surface 54 of the shell 5. In other words, the locked surface 44*c* is inclined toward the rear side X2 as the locked surface extends toward the inner side S1. In other words, the inclination direction of the locked surface 44*c* is the same as the inclination direction of the locking surface 52*a*. Therefore, when the locked surface 44*c* abuts against the locking surface 52*a*, the locked portion 44*b* is easily moved toward the inner wall surface 54.

The holder 4 according to the present embodiment includes two supports 40. Since the supports 40 each have a half-cylinder shape, it is easy to form the locked surface 44*c* as an inclined surface.

The inclination angle θ2 of the locked surface 44*c* with respect to the height direction Z may be the same angle as the inclination angle θ1 of the locking surface 52*a*. The inclination angle θ2 of the locked surface 44*c* may be larger than the inclination angle θ1 of the locking surface 52*a*.

As described above, the shield connector 1 of the present embodiment includes the cylindrical housing 2, the annular seal member 3, the holder 4, and the conductive shell 5. The housing 2 accommodates the terminal 20 and holds the terminal 20. The seal member 3 seals between the outer peripheral surface of the electric wire 7 connected to the terminal 20 and the inner wall surface of the housing 2. The holder 4 is coupled to the housing 2 along the axial direction X of the housing 2 to support the seal member 3. The housing 2 and the holder 4 coupled to each other are inserted into the shell 5 along the axial direction X.

The shell 5 has the protruding portion 52 protruding inward from the inner wall surface 54 of the shell 5. The holder 4 has the engagement piece 44 extending along the axial direction X. The holder 4 is locked by the shell 5 by engaging the engagement piece 44 with the protruding portion 52. The protruding portion 52 has the locking surface 52*a* that locks the engagement piece 44. The locking surface 52*a* is a surface facing the insertion direction IN in which the holder 4 is inserted into the shell 5. The locking surface 52*a* is an inclined surface toward the insertion direction IN as the locking surface extends toward the tip of the protruding portion 52 in the protruding direction. Since the locking surface 52*a* of the protruding portion 52 is the inclined surface as described above, the shield connector 1 of the present embodiment can prevent the holder 4 from coming off from the shell 5.

The engagement piece 44 of the present embodiment has the locked surface 44*c* which is locked by the locking surface 52*a*. The locked surface 44*c* is an inclined surface toward the insertion direction IN as the locked surface extends further away from the inner wall surface 54 of the shell 5. Since the locked surface 44*c* is inclined as described above, coming off of the holder 4 from the shell 5 is more reliably prevented.

In the engagement piece 44, the portion into which the protruding portion 52 is inserted is not limited to the through-hole 44*a*. For example, in the engagement piece 44, the portion into which the protruding portion 52 is inserted may be a recessed portion recessed toward the inner side S1 in the height direction Z.

Note that the number of engagement pieces 44 included in one support 40 is not limited to one as illustrated. One support 40 may have two or more engagement pieces 44. In one support 40, a plurality of engagement pieces 44 may be arranged side by side in the width direction Y.

The coupling portion between the housing 2 and the holder 4 is not limited to the combination of the protruding portion 22*c* and the engagement piece 43. For example, the holder 4 may have a protruding portion, and the housing 2 may have an engagement piece that is engaged with the protruding portion.

The locked surface 44*c* of the holder 4 may not be inclined with respect to the height direction Z. The holder 4 may not be divided into two supports 40. In other words, the holder 4 may be integrally molded in a shape in which two supports 40 are combined.

The contents disclosed in the above embodiments can be performed in combination as appropriate.

In the shield connector according to the present embodiment, the locking surface of the protruding portion of the shell is a surface facing an insertion direction in which the holder is inserted into the shell, and is an inclined surface toward the insertion direction as the locking surface extends toward a tip of the protruding portion in a protruding direction. The locking surface can lock the engagement piece of the holder more deeply when a force in the removal direction acts on the holder. Therefore, the shield connector according to the present embodiment exhibits an effect that can prevent the holder from coming off from the shell.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shield connector comprising:

a cylindrical housing that accommodates a terminal and holds the terminal;

an annular seal member that seals between an outer peripheral surface of an electric wire connected to the terminal and an inner wall surface of the housing;

a holder coupled to the housing along an axial direction of the housing to support the seal member; and a conductive shell into which the housing and the holder coupled to each other are inserted along the axial direction, wherein the shell has a protruding portion protruding inward from an inner wall surface of the shell, the holder has an engagement piece extending along the axial direction, and is locked by the shell by engaging the engagement piece with the protruding portion, the protruding portion has a locking surface that locks the engagement piece if a force acts on the holder in a direction that is opposite to an insertion direction in which the holder is inserted into the shell, and the locking surface is a surface facing the insertion direction, and is an inclined surface toward the insertion direction as the locking surface extends toward a tip of the protruding portion in a protruding direction.

2. The shield connector according to claim 1, wherein the engagement piece has a locked surface that is locked by the locking surface if a force acts on the holder in a direction that is opposite to the insertion direction, and the locked surface is an inclined surface toward the insertion direction as the locked surface extends further away from the inner wall surface of the shell.

3. The shield connector according to claim 2, wherein the locking surface and the locked surface are inclined relative to a second direction that is orthogonal to the insertion direction.

* * * * *